United States Patent [19]
Tatsumi et al.

[11] Patent Number: 5,573,086
[45] Date of Patent: Nov. 12, 1996

[54] DISK BRAKE APPARATUS HAVING NON-CIRCULAR BRAKE LEVER BORE AND MATCHING CAMSHAFT CONNECTION PORTION

[75] Inventors: Yoshihiro Tatsumi; Noriyuki Toriyama; Toshiyuki Harinaga; Masataka Fukuda, all of Nagoya, Japan

[73] Assignee: Nisshinbo Industries Inc., Tokyo, Japan

[21] Appl. No.: 324,510

[22] Filed: Oct. 18, 1994

[30] Foreign Application Priority Data

Oct. 22, 1993 [JP] Japan ............................. 5-061863

[51] Int. Cl.⁶ .................................................. F16D 65/16
[52] U.S. Cl. ................................................. 188/72.9
[58] Field of Search ................................. 188/72.7, 72.6, 188/72.9

[56] References Cited

U.S. PATENT DOCUMENTS 3,643,763  2/1972  Hay .
5,000,294  3/1991  Hunnicutt et al. .
5,020,643  6/1991  Redenbarger ........................ 188/72.9
5,038,895  8/1991  Evans ................................... 188/72.9

FOREIGN PATENT DOCUMENTS 4217983  1/1993  Germany .
1555013  11/1979  United Kingdom .
2165903  4/1986  United Kingdom .

Primary Examiner—Matthew C. Graham
Attorney, Agent, or Firm—Nikaido, Marmelstein, Murray & Oram LLP

[57] ABSTRACT

The disk brake mechanism with an exposed portion of the camshaft being a connection portion having a non-circular radial cross-section. The brake lever has a corresponding non-circular bore engaging the connection portion. A caulked portion is formed around an edge of interengagement of the brake lever with the connection portion thereby affixing the brake lever to the camshaft. The caulking can be done on the brake lever, the connection portion of the camshaft or both.

3 Claims, 6 Drawing Sheets

5,573,086

DISK BRAKE APPARATUS HAVING NON-CIRCULAR BRAKE LEVER BORE AND MATCHING CAMSHAFT CONNECTION PORTION

BACKGROUND OF THE INVENTION

The present invention relates to disk brake mechanisms for motor vehicles.

A conventional disk brake mechanism is shown in FIGS. 8 and 9. Friction pads b1, b2 are provided on both sides of the rotor 'a' as shown in FIG. 8, the rotor rotating with the vehicle wheel. The caliper c is arranged overriding the rotor 'a' and carries the friction pads b1, b2. A bearing bore d as shown in FIG. 9 is formed at the opposite end of the caliper c from the friction pads. A camshaft e is installed in bearing bore d. The exposed portion e' of the camshaft e carries the brake lever f which is held in place by the nut g. A return spring h is arranged around the nut g and biases the lever f in one rotational direction. A push rod j is interposed between the camshaft e and the automatic adjustment mechanism i which in turn is connected to the brake piston (unshown).

The camshaft e is rotated when the lever f is pulled by the operating wire k. The push rod j makes the piston move forward through the automatic adjustment mechanism i to operate the friction pads b1, b2 to contact with the rotor 'a'.

Certain difficulties exist with respect to the conventional structure. A small clearance l occurs between the brake lever f and camshaft e which leaves the lever slightly loose and requires further travel of the lever to achieve the desired level of braking. There exists the possibility that the nut g will loosen and fall off. If this occurs, the lever will also fall off. In operation, the mean diameter of the coil spring widens. In assembly, the nut g has to be put on and tightened. This increases the number of operations for assembly and also increases the number of parts.

OBJECTS AND SUMMARY OF THE INVENTION

It is an object of the present invention to provide a disk brake mechanism in which backlash of the brake lever is substantially reduced.

It is a further object of the present invention to provide a disk brake mechanism in which inadvertent loosening of the nut holding the brake lever in place is avoided.

It is a still further object of the present invention to provide a disk brake mechanism in which widening of the mean diameter of the return spring is avoided.

It is another object of the present invention to provide a disk brake mechanism in which an additional step of assembly is eliminated and the number of parts required is reduced.

The above and other objects of the present invention are obtained in a disk brake mechanism as follows. The mechanism includes the rotor rotationally supported by the wheel of the motor vehicle, friction pads arranged on both planar sides of the rotor, a caliper for mounting on the motor vehicle extending over the circumferential portion of the rotor and carrying the friction pads, a pushing element in the caliper for engaging the friction pads with the rotor to effect braking of the motor vehicle, a camshaft rotatably mounted in a bearing bore in a portion of the caliper away from the friction pads and having an exposed portion, the pushing element engaging the camshaft to be moved axially toward and away from the friction pads by rotation of the camshaft, a brake lever attached to the exposed portion of the camshaft, and a return spring biassing the brake lever in one rotational direction. The exposed portion of the camshaft has a non-circular radial cross-section and the brake lever has a corresponding non-circular bore engaging it. Caulking around the edge of interengagement of the brake lever with the exposed portion either along the edge of the non-circular bore or along the exposed portion itself is provided to complete the connection of the brake lever with the camshaft.

The provision of caulking the brake lever and camshaft together generates certain benefits. Backlash or loss of effective operative travel of the brake lever is eliminated. The brake lever is firmly fixed to the camshaft thereby avoiding inadvertent loosening of any nut holding the brake lever in place. The small mean coil diameter of the return spring minimizes any widening of the mean diameter of the return spring. The number of parts required is reduced thereby increasing the efficiency of the assembly.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
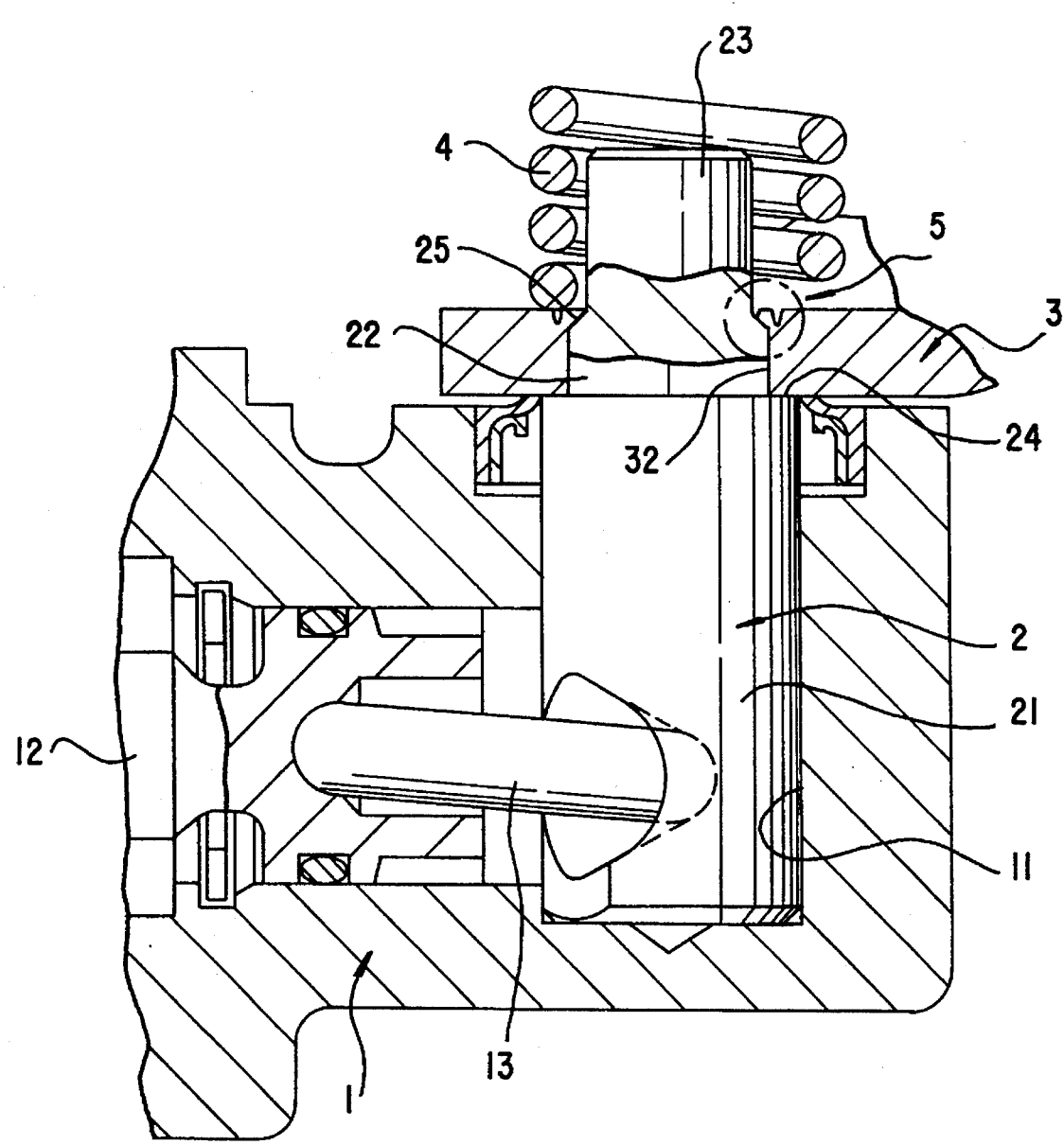
FIG. 1 is a partial cross sectional view through a first embodiment of a camshaft of a caliper of a disk brake mechanism according to the present invention.

The end of the caliper 1 which is opposite or away from the friction pads and the portion overlapping the rotor is provided with a bearing bore 11. The camshaft 2 is rotatably mounted in the bearing bore 11 and has a portion which extends out of the bore 11 and is exposed. The camshaft comprises a column portion 21 in the bearing bore 11, a lever connection portion 22, and a support portion 23. Lever connection portion 22 and support portion 23 constitute the exposed portion.

The brake lever 3 is connected to the camshaft 2 at the connection portion and is not rotatable relative to the camshaft. The return spring 4 is fitted around the support portion 23 of the camshaft 2. A push rod 13 is mounted in the caliper and engages the column portion 21 of the camshaft 2 at one end and the adjustment bolt 12 at the other end. The adjustment bolt 12 is linked with the piston (not shown) contacting the back surface of the friction pad. In this manner, when the camshaft 2 is rotated by operation of the brake lever 3, the push rod 13 transmits that motion to one of the friction pads to cause the same to contact the rotor while the other friction pad contacts the rotor by reaction force.

Figure 2:
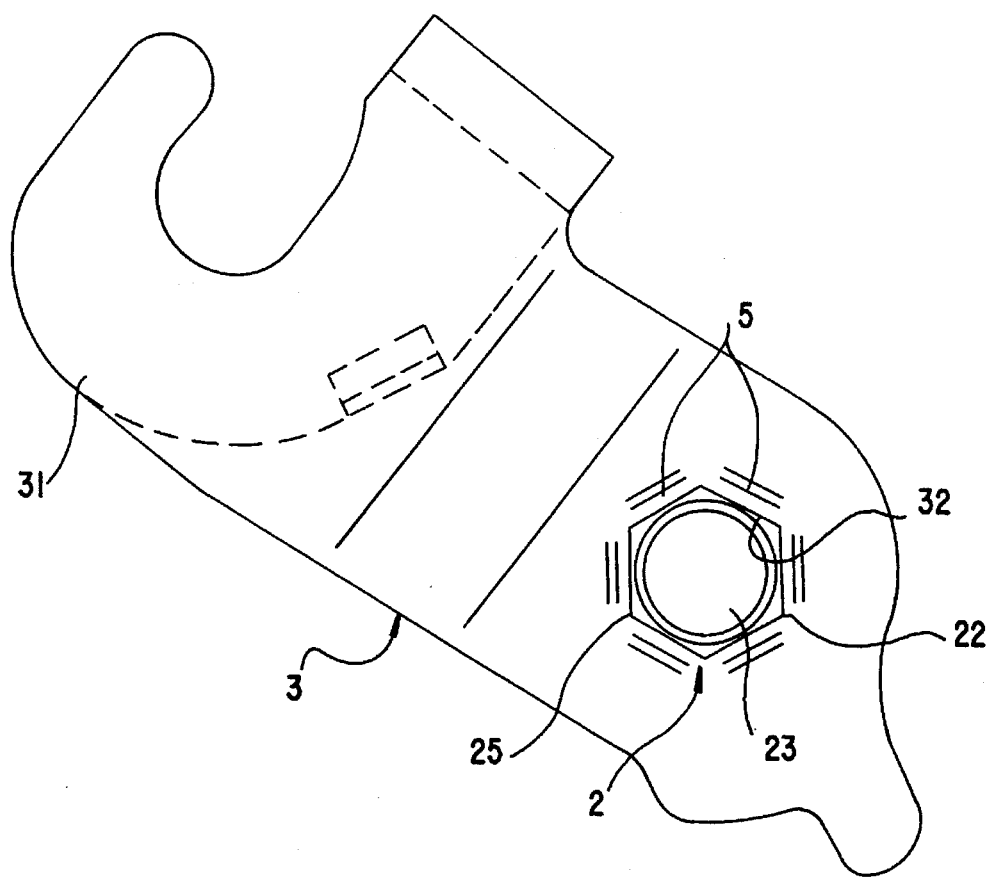
FIG. 2 is a plan view of the device of FIG. 1.

In viewing FIG. 2, it can be seen that the connection portion 22 has a smaller shaped non-circular sectional face than the outer shaped column portion 21 of the camshaft 2. The shape of the non-circular connection portion 22 can be any shape that ensures that the brake lever definitely engages the connection portion to rotate therewith. Standard polygons are preferred, such as a square or a hexagon, however an ellipse or other curved shape can be used. The shape of the support portion 23 of the camshaft 2 is smaller than that of the connection portion 22. It generally supports the spring 4. The differences in dimension of the external form among the column portion 21, the connection portion 22, and the support portion 23 of the camshaft 2 form respective steps 24 and 25. It should be noted that it is not critical to have the external dimension of the connection portion 22 be different than that of the column portion 21.

As can be seen in FIG. 2, the brake lever 3 is a plate having a coupling section 31 at one end and a connecting bore 32 at the other end for connecting with the connection portion 22 of the camshaft 2. The shape of the connecting bore 32 is the same as that of the connection portion 22. However, the size of the connecting bore is slightly smaller than the size of the connection portion 22. This ensures a tight fit.

Figure 3:
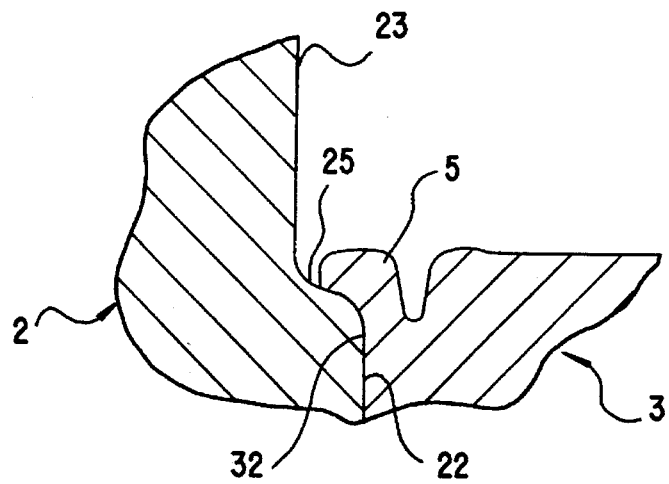
FIG. 3 is an enlarged cross sectional view of a caulked brake lever side in accordance with the present invention.

During assembly, the brake lever 3 is fitted over the connection portion 22 and forced down until it rests on the step 24. Thereafter, one of either the connection portion 22 of the camshaft 2 or the area 5 of the brake lever 3 adjacent the connecting bore 32 is caulked thereby affixing the brake lever 3 to the camshaft 2. As illustrated in FIGS. 2 and 3, the area 5 of the brake lever 3 adjacent the connecting bore 32 is struck by a wedge shaped tool which upsets the material forcing it to tightly engage the shaft. In the particular embodiment shown, the thickness of the brake lever 3 is selected such that it is greater than the distance between step 24 and step 25. In this manner, the deformed upset material of the brake lever overlaps the step 25. The caulking can be done totally surrounding the circumference of the connecting bore 32 or partially around the circumference.

Figure 4:
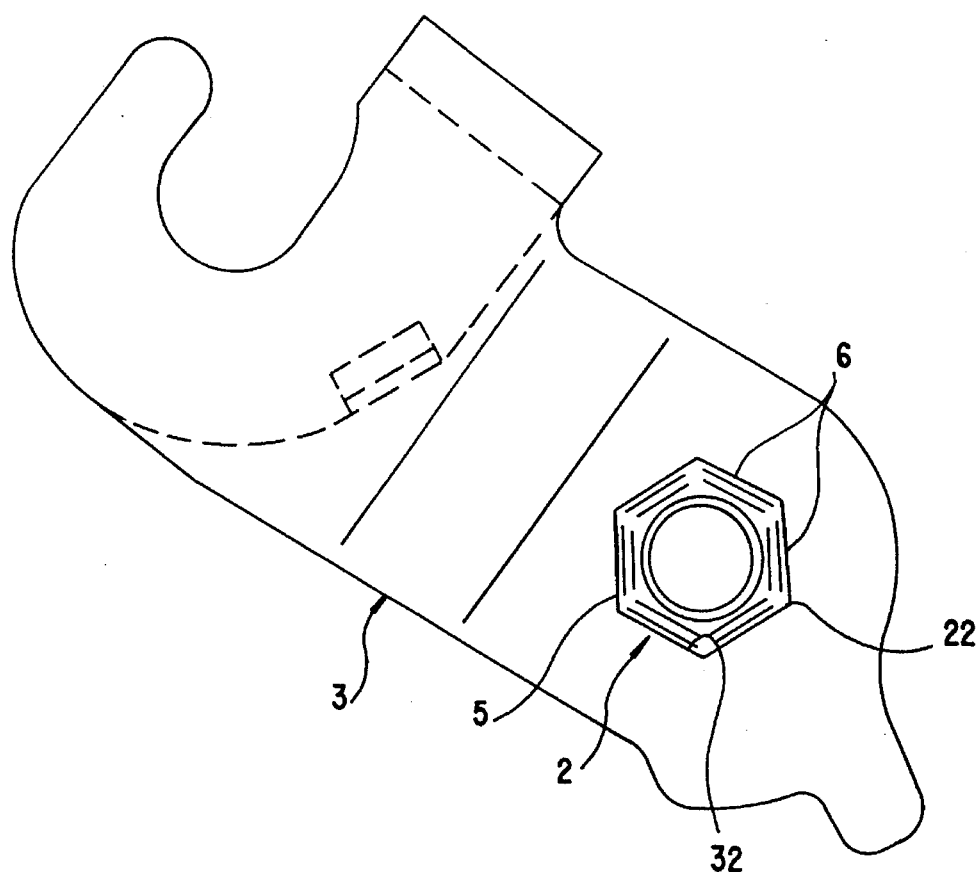
FIG. 4 is a plan view through the second embodiment of the camshaft of the present invention.
Figure 5:
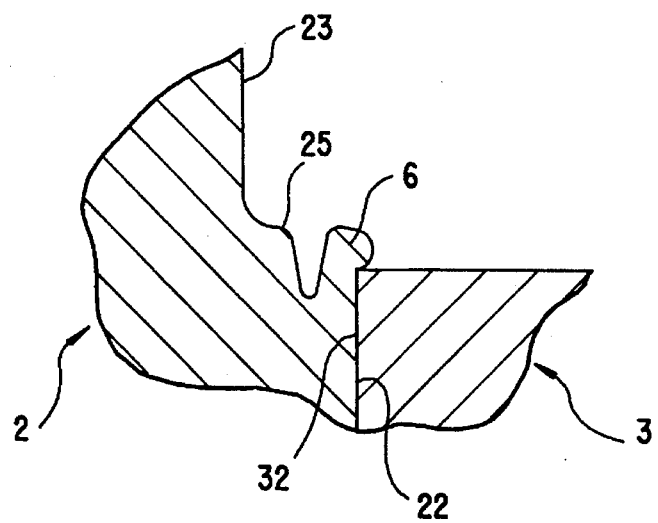
FIG. 5 is an enlarged cross sectional view of a caulked camshaft side in accordance with the present invention.

FIGS. 4 and 5 show a second embodiment of the camshaft of the present invention wherein the caulking is performed on the step 25 of the camshaft 2 forming a caulked portion 6 that overlaps the brake lever 3 and firmly affixes the brake lever 3 to the camshaft 2. In this embodiment, the thickness of the brake lever 3 is selected such that it is smaller than the distance between step 24 and step 25. In this manner, the deformed upset material 6 of the step 25 overlaps the brake lever 3. The caulking can be done totally surrounding the circumference of the connection portion 22 or partially around the circumference. Additionally, the step 25 can be sized to be slightly wider than in the previous embodiment to enable easier caulking.

Figure 6:
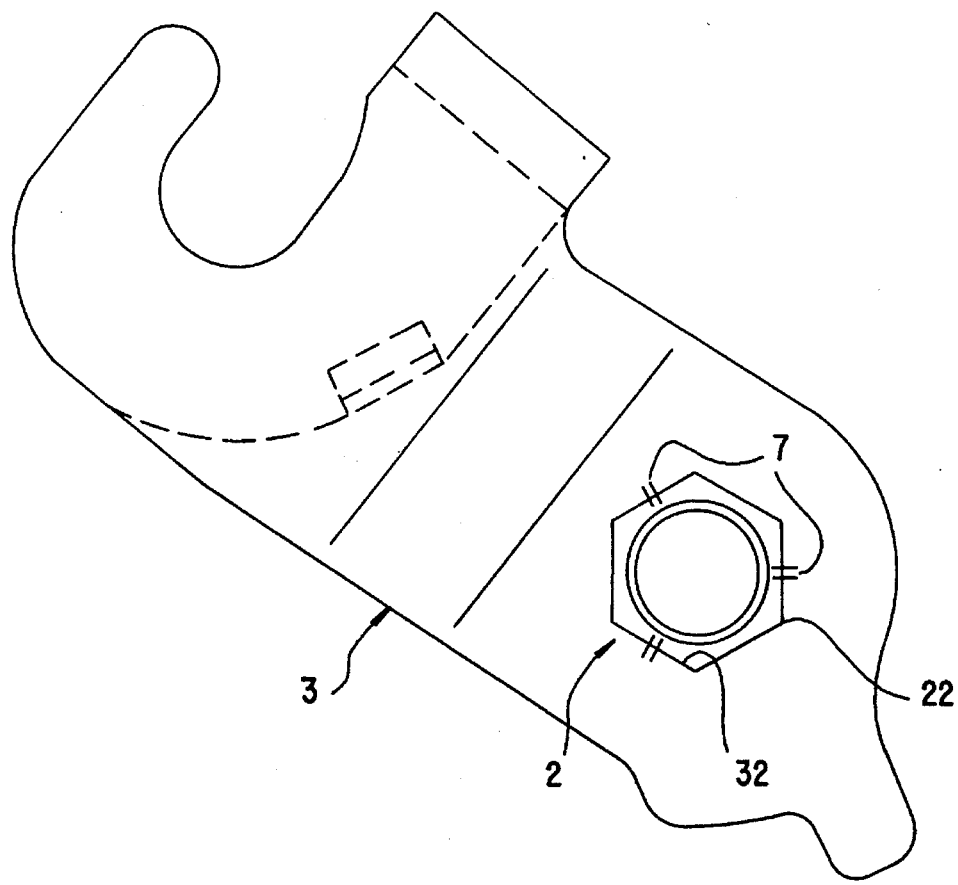
FIG. 6 is a plan view through the third embodiment of the camshaft of the present invention.
Figure 7:
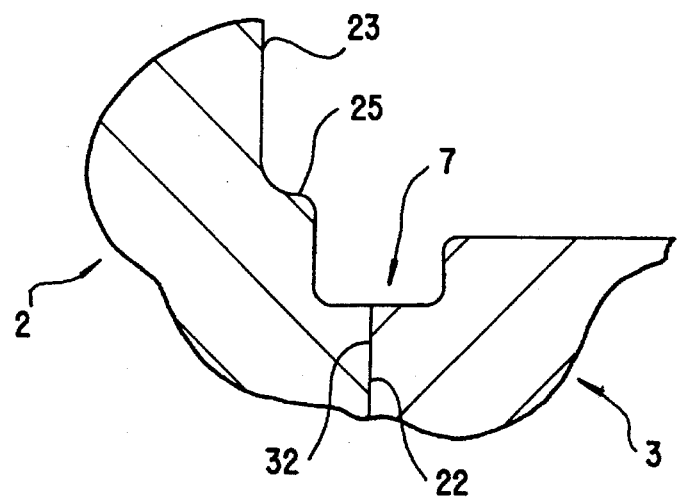
FIG. 7 is an enlarged cross sectional view of an embodiment wherein both the brake lever and the camshaft are caulked.
Figure 8:
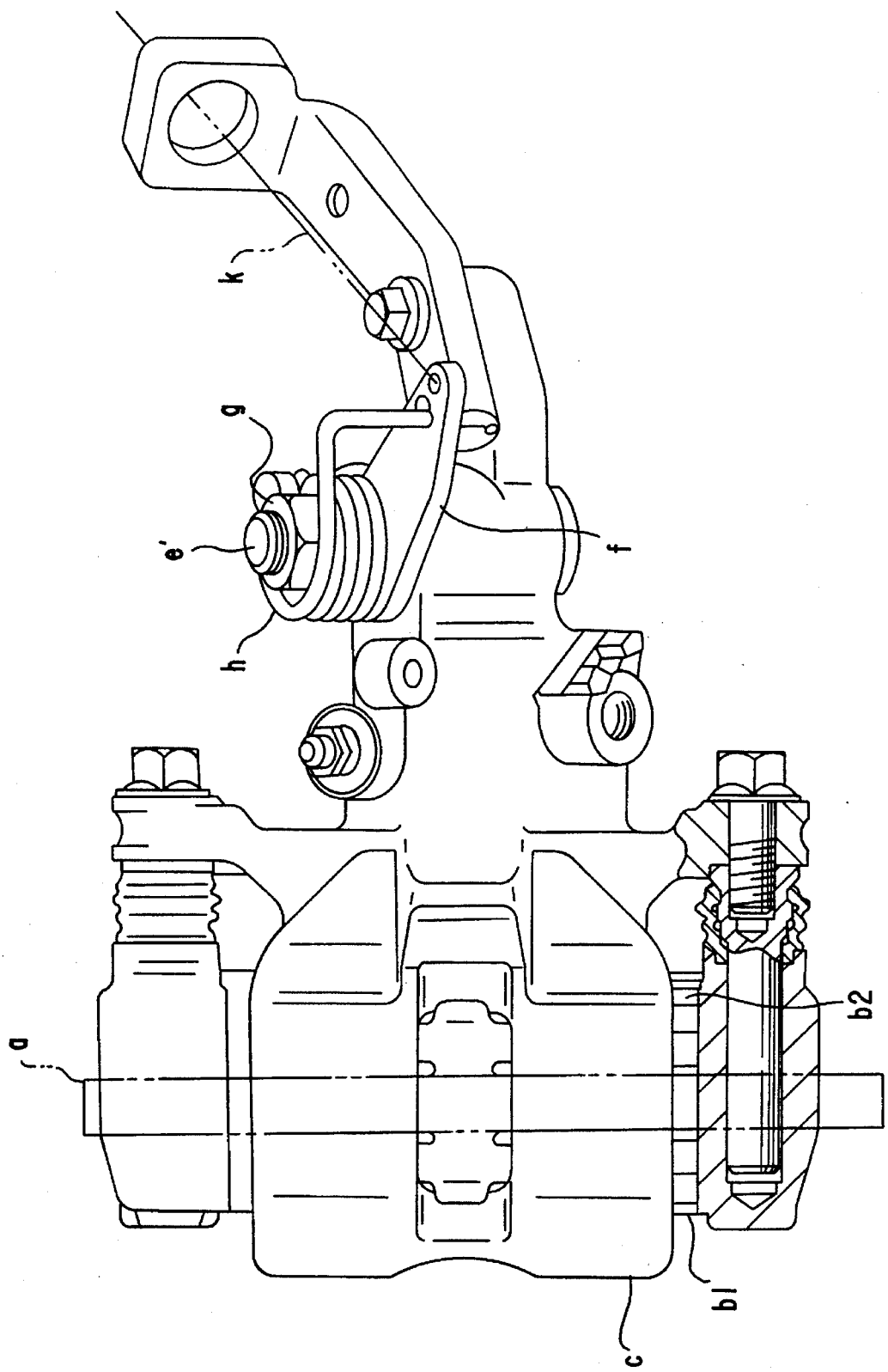
FIG. 8 is an aspect view of a conventional disk brake mechanism.
Figure 9:
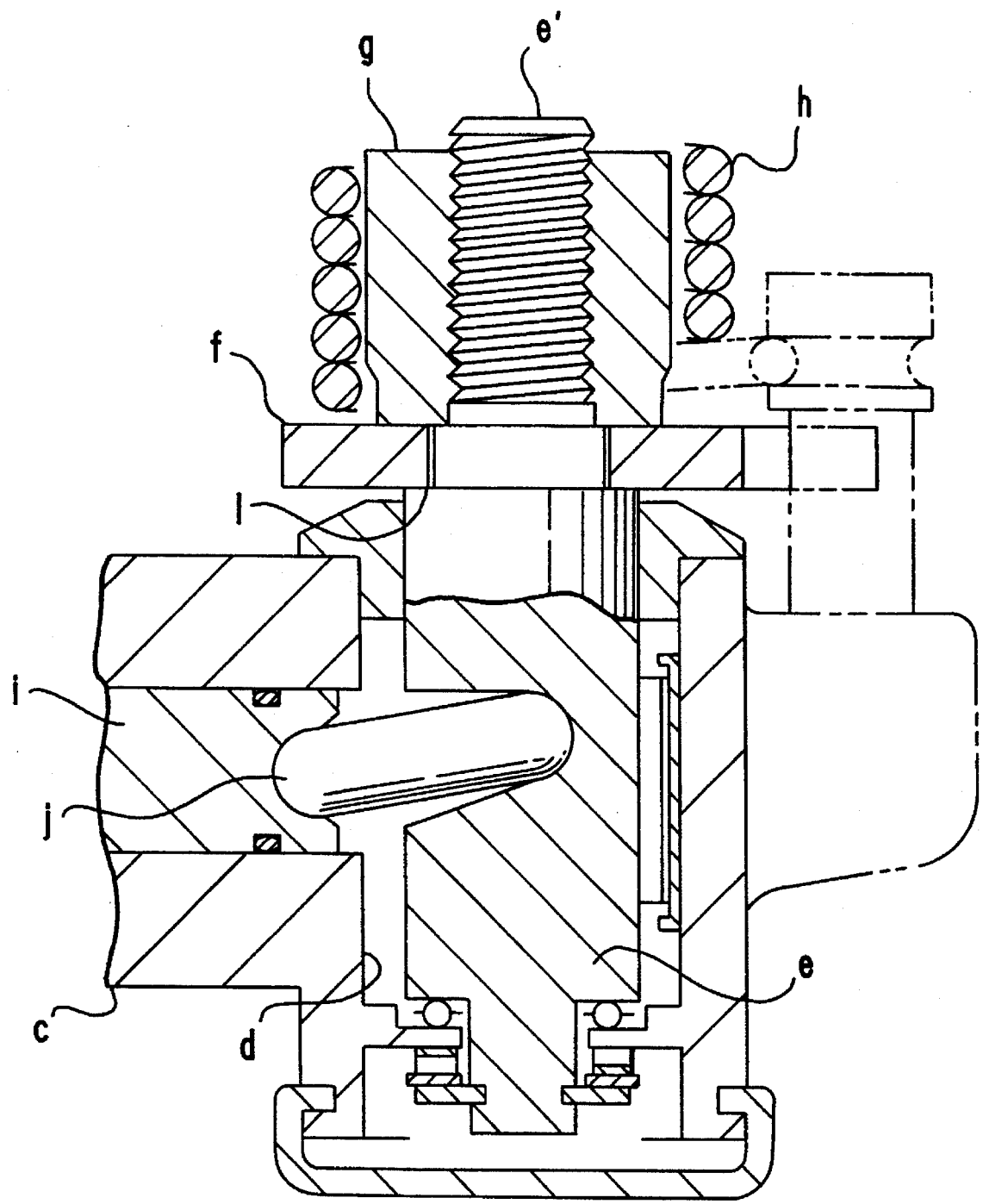
FIG. 9 is a cross sectional view of a portion of a conventional camshaft.

FIGS. 6 and 7 show a third embodiment wherein both the brake lever 3 and the camshaft 2 are caulked. The step 25 of the connection portion 22 and the brake lever 3 adjacent the connecting bore 32 are struck with a tool to form one or more caulked portions 7.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What we claim is:

1. A disk brake mechanism for a wheel of a motor vehicle including a rotor rotationally supported by the wheel of the motor vehicle, friction pads arranged on both planar sides of the rotor, a caliper for mounting on the motor vehicle extending over the circumferential portion of the rotor and carrying the friction pads, a pushing element in the caliper for engaging the friction pads with the rotor to effect braking of the motor vehicle, a camshaft rotatably mounted in a bearing bore in a portion of the caliper away from the friction pads and having an exposed portion and a column portion, said camshaft having a first step which separates said column portion from said exposed portion, the pushing element engaging the camshaft to be moved axially toward and away from the friction pads by rotation of the camshaft, a brake lever attached to said exposed portion, and a return spring biasing the brake lever in one rotational direction, said exposed portion having a second step, said exposed portion including a connection portion defined between said first step and said second step, said connection portion having a non-circular radial cross-section, said brake lever having a corresponding non-circular bore engaging said connection portion, said brake lever having an axial thickness greater than the axial distance between said first step and said second step, and at least a portion of said brake lever being deformed so as to overlap said second step, thereby affixing said brake lever to said camshaft.

2. A disk brake mechanism for a wheel of a motor vehicle including a rotor rotationally supported by the wheel of the motor vehicle, friction pads arranged on both planar sides of the rotor, a caliper for mounting on the motor vehicle extending over the circumferential portion of the rotor and carrying the friction pads, a pushing element in the caliper for engaging the friction pads with the rotor to effect braking of the motor vehicle, a camshaft rotatably mounted in a bearing bore in a portion of the caliper away from the friction pads and having an exposed portion and a column portion, said camshaft having a first step which separates said column portion from said exposed portion, the pushing element engaging the camshaft to be moved axially toward and away from the friction pads by rotation of the camshaft, a brake lever attached to said exposed portion, and a return spring biasing the brake lever in one rotational direction, said exposed portion having a second step, said exposed portion including a connection portion defined between said first step and said second step, said connection portion having a non-circular radial cross-section, said brake lever having a corresponding non-circular bore engaging said connection portion, said brake lever having an axial thickness smaller than the axial distance between said first step and said second step, and at least a portion of said second step being deformed so as to overlap said brake lever, thereby affixing said brake lever to said camshaft.

3. A disk brake mechanism as recited in claim 2, wherein said brake lever is deformed around the circumference of said non-circular bore, thereby affixing said brake lever to said camshaft.

\* \* \* \* \*